United States Patent
Johnson

(10) Patent No.: US 10,104,337 B2
(45) Date of Patent: *Oct. 16, 2018

(54) DISPLAYING A PRESENTER DURING A VIDEO CONFERENCE

(71) Applicant: Google Inc., Mountain View, CA (US)

(72) Inventor: Christopher Paul David Johnson, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/640,552

(22) Filed: Jul. 2, 2017

(65) Prior Publication Data

US 2018/0070051 A1    Mar. 8, 2018

Related U.S. Application Data

(63) Continuation of application No. 14/932,932, filed on Nov. 4, 2015, now Pat. No. 9,699,412, which is a
(Continued)

(51) Int. Cl.
| | |
|---|---|
| H04N 7/15 | (2006.01) |
| G06F 3/048 | (2013.01) |
| G06Q 10/10 | (2012.01) |
| H04L 29/06 | (2006.01) |
| H04N 21/4788 | (2011.01) |

(Continued)

(52) U.S. Cl.
CPC .............. *H04N 7/15* (2013.01); *G06F 3/048* (2013.01); *G06Q 10/10* (2013.01); *H04L 65/1076* (2013.01); *H04L 65/4046* (2013.01); *H04N 7/147* (2013.01); *H04N 7/152* (2013.01); *H04N 21/42203* (2013.01); *H04N 21/4312* (2013.01); *H04N 21/4532* (2013.01);
(Continued)

(58) Field of Classification Search
None
See application file for complete search history.

(56) References Cited

U.S. PATENT DOCUMENTS

| | | |
|---|---|---|
| 6,532,218 B1 | 3/2003 | Shaffer et al. |
| 7,561,177 B2 | 7/2009 | Cheatle et al. |

(Continued)

OTHER PUBLICATIONS

"European Search Report, International Search Report and Written Opinion", International Patent Application No. PCT/US2015/016718, dated May 8, 2015, 12.
(Continued)

*Primary Examiner* — Creighton Smith
(74) *Attorney, Agent, or Firm* — IP Spring

(57) ABSTRACT

Implementations generally relate to displaying a presenter during a video conference. In some implementations, a method includes providing a user interface of a video conference between at least a first user and a second user, where the first user is associated with a first endpoint and the second user is associated with a second endpoint. The method also includes determining view rank values for each of the first endpoint and the second endpoint. The method also includes causing the user interface to display a first user video stream in a current presenter position and to display a second user video stream in a secondary presenter position based on the view rank values.

20 Claims, 6 Drawing Sheets

Related U.S. Application Data continuation of application No. 14/249,298, filed on Apr. 9, 2014, now Pat. No. 9,210,379.

(60) Provisional application No. 61/945,359, filed on Feb. 27, 2014.

(51) Int. Cl.
  *H04N 7/14* (2006.01)
  *H04N 21/422* (2011.01)
  *H04N 21/431* (2011.01)
  *H04N 21/45* (2011.01)
  *H04M 3/56* (2006.01)
  *H04L 12/18* (2006.01)

(52) U.S. Cl.
  CPC ..... *H04N 21/4788* (2013.01); *H04L 12/1822* (2013.01); *H04M 3/567* (2013.01)

(56) References Cited

U.S. PATENT DOCUMENTS

| | | |
|---|---|---|
| 8,248,448 B2 | 8/2012 | Feng et al. |
| 8,300,556 B2 | 10/2012 | Kalipatnapu et al. |
| 8,319,814 B2 | 11/2012 | King et al. |
| 9,210,379 B2 | 12/2015 | Johnson |
| 2006/0092269 A1 | 5/2006 | Baird et al. |
| 2007/0299981 A1 | 12/2007 | Baird et al. |
| 2012/0002001 A1 | 1/2012 | Prentice |
| 2012/0290305 A1 | 11/2012 | Feng et al. |
| 2013/0021423 A1 | 1/2013 | Kalipatnapu et al. |
| 2013/0179491 A1 | 7/2013 | Bennett et al. |
| 2013/0263021 A1 | 10/2013 | Dunn et al. |
| 2013/0335508 A1 | 12/2013 | Mauchly |
| 2017/0249122 A1* | 8/2017 | Pance ............ G06F 3/165 |

OTHER PUBLICATIONS

International Bureau of WIPO, , International Preliminary Report on Patentability for International Patent Application No. PCT/US2015/016718, dated Aug. 30, 2016, 8 pages.

\* cited by examiner

DISPLAYING A PRESENTER DURING A VIDEO CONFERENCE

CROSS-REFERENCE TO RELATED APPLICATIONS

This application is a continuation of U.S. application Ser. No. 14/932,932 filed Nov. 4, 2015, which is a continuation of U.S. application Ser. No. 14/249,298 filed Apr. 9, 2014, now U.S. Pat. No. 9,210,379, Issued Dec. 8, 2015, which claims the benefit of U.S. Provisional Application No. 61/945,359 filed Feb. 27, 2014, the contents of which are all incorporated herein by reference in their entirety.

BACKGROUND

Video conferencing is often used in business settings, and enables participants to share video and audio content with each other in real-time across geographically dispersed locations. A communication device at each location typically uses a video camera and microphone to send video and audio streams, and uses a video monitor and speaker to play received video and audio streams, which are transmitted in real-time across a network from one location to another. Video conferencing simulates real-time, in-person meetings by enabling participants to see and hear each other during a video conference.

SUMMARY

Implementations generally relate to displaying a presenter during a video conference. In some implementations, a method includes providing a user interface of a video conference between at least a first user and a second user, where the first user is associated with a first endpoint and the second user is associated with a second endpoint. The method also includes determining view rank values for each of the first endpoint and the second endpoint. The method also includes causing the user interface to display a first user video stream in a current presenter position and to display a second user video stream in a secondary presenter position based on the view rank values.

With further regard to the method, in some implementations, the method further includes collecting endpoint data associated with each endpoint of the video conference. In some implementations, the method further includes ranking the endpoints in the video conference based on their view rank values. In some implementations, each view rank value indicates a likelihood that the user associated with the respective endpoint is speaking. In some implementations, each view rank value is based at least in part on a duration of speaking. In some implementations, each view rank value is based at least in part on a type of audio detected. In some implementations, each view rank value is based at least in part on a number of people who are in a room associated with the respective endpoint. In some implementations, each view rank value is based at least in part on a type of endpoint. In some implementations, each view rank value is based at least in part on a history of past video conferences. In some implementations, each view rank value is based at least in part on whether at least one predetermined video function has been turned on.

In some implementations, a method includes providing a user interface of a video conference between at least a first user and a second user, where the first user is associated with a first endpoint and the second user is associated with a second endpoint. The method further includes determining view rank values for each of the first endpoint and the second endpoint, where each view rank value indicates a likelihood that the user associated with the respective endpoint is speaking, where each view rank value is based at least one or more of a duration of speaking, a type of audio detected, a number of people who are in a room associated with the respective endpoint, a type of endpoint, a history of past video conferences, and whether at least one predetermined video function has been turned on. The method further includes causing the user interface to display a first user video stream in a current presenter position and to display a second user video stream in a secondary presenter position based on the view rank values.

In some implementations, a system includes one or more processors, and logic encoded in one or more tangible media for execution by the one or more processors. When executed, the logic is operable to perform operations including: providing a user interface of a video conference between at least a first user and a second user, where the first user is associated with a first endpoint and the second user is associated with a second endpoint; determining view rank values for each of the first endpoint and the second endpoint; and causing the user interface to display a first user video stream in a current presenter position and to display a second user video stream in a secondary presenter position based on the view rank values.

With further regard to the system, in some implementations, the logic when executed is further operable to perform operations including collecting endpoint data associated with each endpoint of the video conference. In some implementations, the logic when executed is further operable to perform operations including ranking the endpoints in the video conference based on their view rank values. In some implementations, each view rank value indicates a likelihood that the user associated with the respective endpoint is speaking. In some implementations, each view rank value is based at least in part on a duration of speaking. In some implementations, each view rank value is based at least in part on a type of audio detected. In some implementations, each view rank value is based at least in part on a number of people who are in a room associated with the respective endpoint. In some implementations, each view rank value is based at least in part on a type of endpoint. In some implementations, each view rank value is based at least in part on a history of past video conferences.

DETAILED DESCRIPTION

Implementations described herein improve user engagement in a social network by optimizing the display of a presenter in a video conference. In various implementations, a system provides a user interface of a video conference between multiple users, where each user is associated with an endpoint. The endpoints are client devices used by participants to connect to the video conference. Endpoints may also be referred to as video conference endpoints. The system determines view rank values for each of the endpoints. As described in more detail below, each view rank value for a given endpoint indicates a likelihood that the user associated with the endpoint is speaking during the meeting. Also, view rank values are used by the system to rank endpoints for the purpose of selecting which video stream to display in a main video window. In various implementations, the main video window is located in a current presenter position of a user interface.

The system causes the user interface to display a particular video stream in the main video window at the current presenter position and to display other video streams in other windows located in secondary presenter positions based on the view rank values. In various implementations, the view rank values are based on several aspects associated with the endpoints. For example, the view rank values may be based on any combination of voice volume, speaking duration, endpoint type, sound type, etc.

Figure 1:
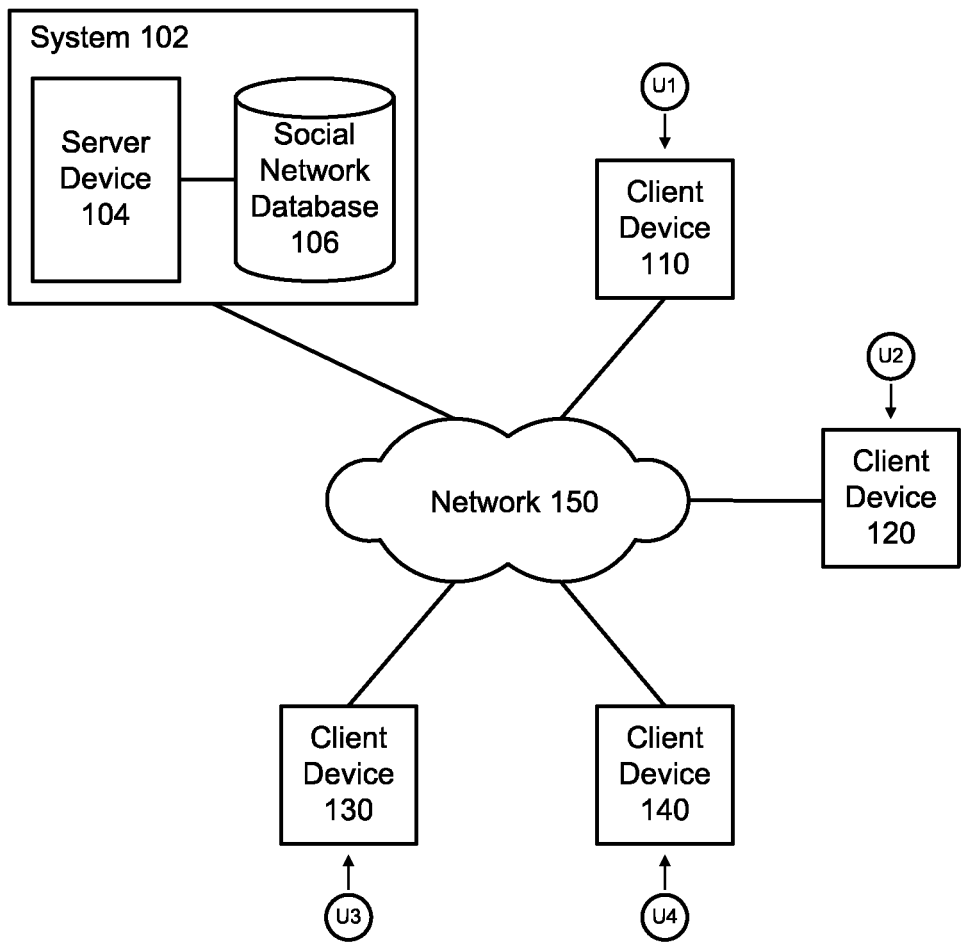
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. Network environment 100 also includes client devices 110, 120, 130, and 140, which may communicate with each other via system 102 and a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may interact with each other in a multi-user video conference, where respective client devices 110, 120, 130, and 140 transmit media streams to each other.

In various implementations, the media streams may include different types of media streams (e.g., one or more video streams and/or one or more audio streams). For example, such media streams may include video streams that display users U1, U2, U3, and U4, and may include associated audio streams. Also, the media streams may include media streams being transmitted in different directions (e.g., one or more outbound streams and/or one or more inbound streams) relative to each client device 110, 120, 130, and 140. As described in more detail below in connection with FIGS. 2 and 3A and 3B, system 102 may present the media streams to users U1, U2, U3, and U4 in a multi-user video conference in a manner that enhances the experience for users U1, U2, U3, and U4.

Figure 2:
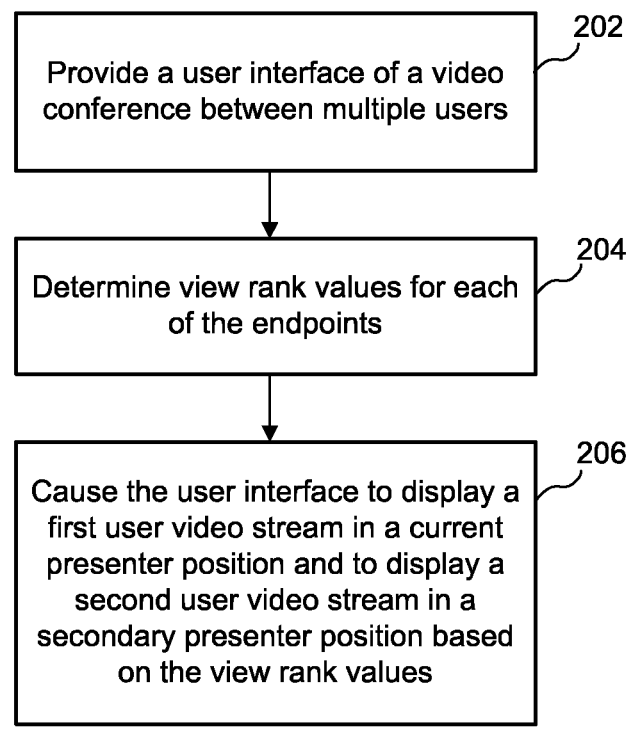
FIG. 2 illustrates an example simplified flow diagram for displaying a presenter during a video conference, according to some implementations.

FIG. 2 illustrates an example simplified flow diagram for displaying a presenter during a video conference, according to some implementations. Referring to both FIGS. 1 and 2, a method is initiated in block 202, where system 102 provides a user interface of a video conference between multiple users (e.g., at least a first user U1 and a second user U2, etc.). In various implementations, the first user is associated with a first endpoint and the second user is associated with a second endpoint.

For ease of illustration, example implementations are described herein in the context of a first user and a second user (e.g., users U1 and U2). These implementations also apply to users in addition to users U1 and U2, such as users U3 and U4, etc.

In some implementations, the user interface displays a first user video stream in a current presenter position and displays a second user video stream in a secondary presenter position.

Figure 3:
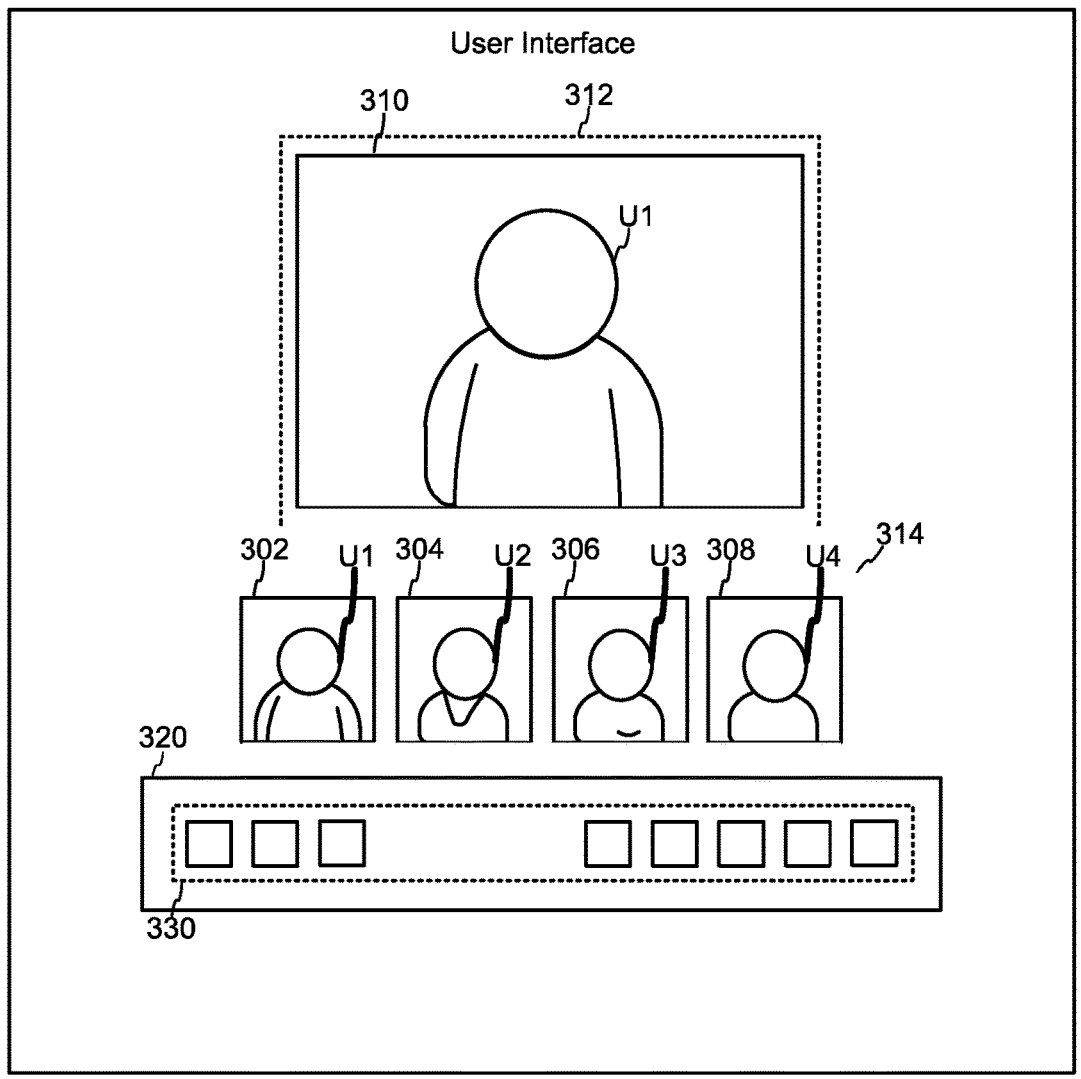
FIG. 3 illustrates an example simplified user interface, according to some implementations.

FIG. 3 illustrates an example simplified user interface 300, according to some implementations. As described in more detail below, FIG. 3 shows a video stream associated with a first user (e.g., user U1) that is displayed in a current presenter position 312 and shows a video stream associated with a second user (e.g., user U2) that is displayed in a secondary presenter position 314.

In some implementations, user interface 300 includes video windows 302, 304, 306, and 308, which display video streams of respective users U1, U2, U3, and U4 who are participating in a multi-user video conference. For ease of illustration, four users U1, U2, U3, and U4 are shown. In various implementations, there may any number of users participating in the multi-user video conference (e.g., up to 10 users or more). In various implementations, system 102 enables users U1, U2, U3, and U4 to communicate by any combination of video, voice, audio, and typed chats.

In some implementations, user interface 300 includes a main video window 310, which corresponds to "current presenter position" 312. For ease of illustration, main video window 310 (solid-line box) is shown separately from and within current presenter position 312 (dotted-line box). In various implementations, main video window 310 and current presenter position 312 may directly overlap. In some implementations, the current presenter position 312 is a prominent position in user interface 300 that indicates that the user shown in that position is the "current presenter." In various implementations, the current presenter is the user who is communicating to the other users by voice. In this particular example, main video window 310 is displaying a video stream of user U1, who is the current presenter.

In some implementations, the video windows 302, 304, 306, and 308 correspond to "secondary presenter position" 314, and show all users including users who are not the current presenter. The series of video windows in secondary presenter position 314 may be referred to as a film strip, in that it shows thumbnails of all users U1, U2, U3, U4, etc. As shown, in some implementations, the current presenter (e.g., user U1) in the main video window 310 is also shown in one of the video windows (e.g., video window 302) in secondary presenter position 314. For ease of illustration, video windows 302, 304, 306, and 308 (solid-line boxes) are shown separately from each other and within secondary presenter position 314 (dotted-line box). In various implementations, each of the video windows 302, 304, 306, and 308 and a corresponding secondary presenter position 314 directly overlap. In some implementations, the secondary presenter position 314 is in a less prominent position in user interface 300. The second presenter position 314 indicates all users participating in the multi-user video conference, including the current presenter and the other users. In various implementations, the other users who are not the current presenter are users who are watching or listening to the current presenter. In this particular example, video windows 302, 304, 306, and 308 are displaying a video stream of all users U1, U2, U3, and U4.

In some implementations, current presenter position 312 and main video window 310 are in a prominent position in user interface 300. Also, main video window 310 is a larger version of the corresponding video window in the secondary present position (e.g., video window 302). In some implementations, main video window 310 is larger than the other video windows 302, 304, 306, and 308. The combination of main video window 310 being in the present position 312 and being larger than the other videos visually indicates that the user shown in main video window 310 is the current presenter.

In some implementations, user interface 300 also includes a control window 320, which includes control buttons 330 (enclosed in dotted lines). For ease of illustration, eight control buttons are shown. The number of control buttons may vary depending on the specific implementation. The functionality of control buttons 330 also varies depending on the specific implementation. In some implementations, one of the control buttons 330 may function to make a particular user the current presenter. As such, the selecting of one of the control buttons 330 may cause the video stream of the user who selected the control button to assume the current presenter position.

Figure 4:
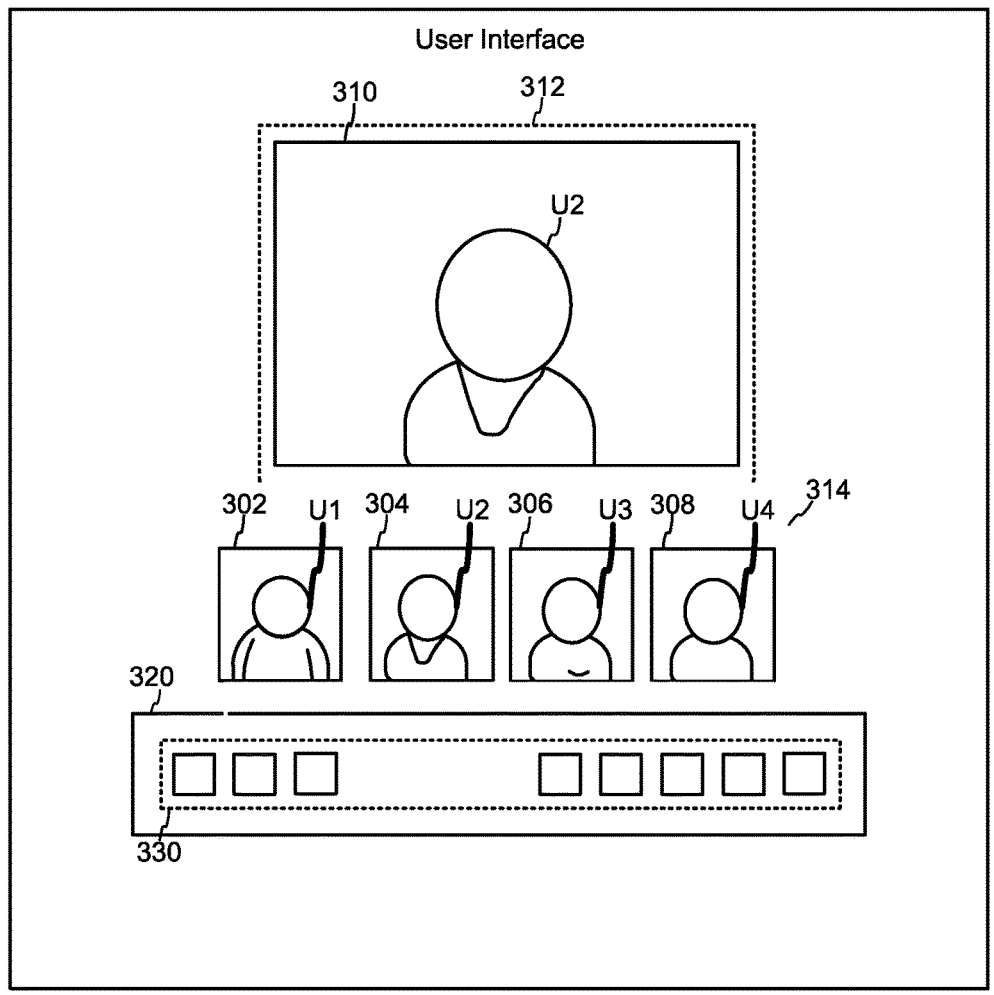
FIG. 4 illustrates the example user interface of FIG. 3 with a different current presenter, according to some implementations.

FIG. 4 illustrates the example user interface 300 of FIG. 3 with a different current presenter, according to some implementations. In some implementations, user interface 300 includes the same elements as those of FIG. 3. The main difference between FIG. 3 and FIG. 4 is that FIG. 4 shows the video stream associated with the second user (e.g., user U2) being displayed in the current presenter position 312 and shows the video stream associated with the first user (e.g., user U1) being displayed in the secondary presenter position 314 and no longer in the current presenter position 312.

As FIG. 4 shows, user U2 becomes the current presenter after system 102 detects the voice of user U2, and based at least in part on view rank values. System 102 then causes user interface 300 to display the video stream associated with user U2 in current presenter position 310 and causes user interface 300 to display the video stream associated with user U1 in the secondary presenter position and no longer in current presenter position 310. For ease of illustration, some of these example implementations are described in the context of user U2 becoming the current presenter. In various implementations, other users such as user U3 or user U4, etc. may also become the current presenter.

In this example, user U2 begins to talk. In various implementations, system 102 uses a detection algorithm that recognizes audio elements in a video stream. For example, the detection algorithm may detect the voice of user U2 as an indication that user U2 intends to be the current presenter.

As described in more detail below, system 102 also determines view rank values of each of the endpoints, ranks the view rank values, and displays or delays positioning the video stream of a new user in current presenter position 312.

In some implementations, user interface 300 displays the video stream associated with user U2 in the current presenter position 312 until system 102 detects at least one subsequent voice from user U1 or any other user (e.g., user U3 or user U4). In some implementations, system 102 may also switch the video stream displayed in main video window 310 each time a different user speaks. As described in more detail below in connection with blocks 204 and 206 of FIG. 2, system 102 regulates when and how quickly to switch speakers in current presenter position 312 based on relative view rank values.

For ease of illustration, user interface 300 shows one larger current presenter position 312 and smaller secondary presenter position 314, where the smaller windows in the secondary presenter position 314 are the same size. Other configurations are also possible. For example, in some implementations, for endpoints that have higher view rank values where users are not the current presenter, those users may be viewed in windows that are smaller than the window of the current presenter position 312, yet may be larger than the other windows in the secondary presenter positions.

Referring still to FIG. 2, in block 204, system 102 determines view rank values for each endpoint (e.g., the first endpoint, the second endpoint, etc.). In various implementations, each view rank value for a given endpoint indicates a likelihood that the user associated with the respective endpoint is speaking during the video conference.

In some implementations, a view rank value may be based in part on one or more voice aspects such as volume and duration. For example, system 102 may detect an increase in the volume of the voice of a user who is not the current presenter. If the volume at a particular endpoint increases above a predefined threshold and remains above the predefined threshold longer than a predefined duration, system 102 may change the view rank value for a given endpoint based on an average volume being over a predetermined duration (e.g., average volume over the last 3 seconds, 5 seconds, 10 seconds, etc.) at that endpoint. For example, in some implementations, system 102 may increase the view rank value based on an average volume being over the predetermined duration. In some implementations, average volume incorporates pauses in audio sound. In various scenarios, it would be expected to have varying pauses in audio sound due to the current presenter pausing to think, for example.

In some implementations, a view rank value may be based in part on duration of speaking, or the amount of time that the user associated with the endpoint is talking during the meeting. In some implementations, system 102 may change the view rank value at a given endpoint based a predetermined duration of speaking (e.g., average volume over the last 3 seconds, 5 seconds, 10 seconds, etc.) at that endpoint. For example, in some implementations, system 102 may increase the view rank value based on an amount of time that a given user has been speaking being over the predetermined duration of speaking.

In various implementations, some aspects described herein may influence the view rank value for the duration of a given meeting. In some implementations, if a couple of users are doing most of the talking, those users are probably the most important users from a presenting standpoint. As such, system 102 may increase the view rank value for those people for the duration of the meeting. As described in more detail below, some aspects may influence view rank value for future meetings.

In some implementations, a view rank value may be based in part on the type of audio detected by system 102. For example, system 102 may give a higher view rank value to audio that is a human voice. System 102 may give a lower view rank value to audio that is "noise." For example, a simple small noise such as paper shuffling can cause a seemingly random person to appear on the current presenter screen without that person on the other knowing that they are being watched.

In some implementations, a view rank value may be based in part on the number of people who are in a room associated with the respective endpoint. In some implementations, system 102 may apply a face detection algorithm to detect faces in a video stream. System 102 may then determine the number of people from the detected faces. In some implementations, system 102 may change the view rank value based on a predetermined number threshold of people in a conference room, at a given endpoint (e.g., 2 or more users, 3 or more users, 4 or more users, etc.). For example, in some implementations, system 102 may decrease the view rank value at a given endpoint based on a number of people in a conference room associated with that endpoint meeting the predetermined number threshold. System 102 may decrease the view rank value when there are more people, because with more people, there may be a higher likelihood of background noise, side conversations, etc.

In some implementations, a view rank value may be based in part on the type of endpoint. For example, system 102 may determine whether the type of endpoint is a conference room or a single user endpoint. In some implementations, system 102 may increase the view rank value based on the endpoint being a single user endpoint. In some implementations, system 102 may decrease the view rank value based on the endpoint being a conference room/multiuser endpoint.

In some implementations, a view rank value may be based in part on the history of past video conferences. For example, system 102 may collect data and compute talking statistics from past meetings. In some implementations, system 102 may increase the view rank value if the endpoint has historically been associated with users who often speak. In some implementations, system 102 may search a calendar system to determine a given user's participation in previous meetings. System 102 may then determine the endpoint associated with that user, and retrieve view rank values of past meetings. In various implementations, system 102 may use the previous view rank values of a given endpoint to influence or weigh into the view rank value of that endpoint in the current and/or future meetings.

In some implementations, a view rank value may be based in part on whether particular video functions have been turned on. For example, in some implementations, a view rank value may be based in part on whether a video mute feature has been turned on. In some implementations, a view rank value may be based on whether the endpoint has been muted by someone else in the meeting. For example, system 102 may decrease the view rank value of a given endpoint based on a user turning on the mute feature at that given endpoint. In some implementations, system 102 may decrease the view rank value based on another user turning on the mute feature for another endpoint, where the view rank value is decreased at that other endpoint.

In some implementations, a view rank value may be based in part on whether a screen share feature has been turned on. A screen share feature is a feature where a user displays his or her screen in the video stream in order for other users to view the shared screen. In some implementations, the view rank value may also be based on the combination of the screen share feature being turned on and combined with segments of "talking." In some implementations, system 102 may enable a given talking segment to influence a view rank value when the talking segment meets a predetermined length criteria (e.g., greater than 30 seconds, 1 minute, 2 minutes, etc.). In some implementations, system 102 may increase the view rank value for a given endpoint based the share feature being turned on for that endpoint. In some implementations, system 102 may increase the view rank value to an even higher degree for a given endpoint based the share feature being turned on for that endpoint and based on the segment of talking meeting a predetermined duration threshold.

In various implementations, system 102 determines various view rank sub-values associated with various aspects of each endpoint (e.g., voice aspects, endpoint aspects, history aspects, etc.). System 102 then aggregates the view rank sub-values and any combination of the aspects described herein into a final view rank value for each endpoint.

In block 206, system 102 causes the user interface to display a first user video stream in a current presenter position and to display a second user video stream in a secondary presenter position based on the view rank values.

Implementations described herein enhance the user experience in video conferences by minimizing the random, jarring switching of the presenter in the current presenter window.

Although the steps, operations, or computations may be presented in a specific order, the order may be changed in particular implementations. Other orderings of the steps are possible, depending on the particular implementation. In some implementations, multiple steps shown as sequential in this specification may be performed at the same time.

Figure 5:
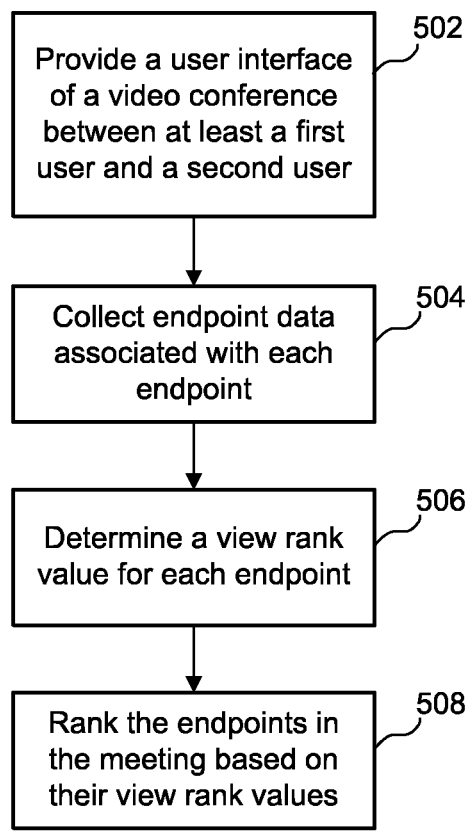
FIG. 5 illustrates an example simplified flow diagram for determining a current user to display in a current presenter position, according to some implementations.

FIG. 5 illustrates an example simplified flow diagram for determining a current user to display in a current presenter position, according to some implementations. In various implementations, a method is initiated in block 502, where system 102 provides a user interface of a video conference between at least a first user and a second user. In some implementations, the user interface displays a first user video stream in a current presenter position and displays a second user video stream in a secondary presenter position.

In block 504, system 102 collects endpoint data associated with each endpoint of the video conference. The endpoint data can be any data associated with view rank values and related aspects described above in connection with block 204 of FIG. 2.

In block 506, system 102 determines a view rank value for each endpoint, where the view rank value is based on the endpoint data. Implementations described above with regard to block 204 of FIG. 2 above also apply to block 506 of FIG. 3.

In block 508, system 102 ranks the endpoints in the video conference based on their view rank values. In various implementations, system 102 applies a ranking algorithm to all participants in the hangout. In some implementations, a higher view rank value associated with a given endpoint corresponds to, or roughly translates to, a higher desire of other participants to see the user associated with the given endpoint on the main screen in the current presenter position. Conversely, a lower view rank value associated with a given endpoint corresponds to, or roughly translates to, a lower desire of other participants to see the user associated with the given endpoint on the main screen.

In various implementations, system 102 applies display bias on each endpoint based on the ranking. For example, in some implementations, if a given endpoint has a higher view rank value, system 102 applies a display bias to that endpoint in order to display the user associated with that endpoint on the main screen in the current presenter position as opposed to displaying other users associated with other endpoints. Such a display bias will be higher than that applied to other endpoints having lower ranking view rank values. This is because the higher the ranking view rank value of an endpoint, the more likely that the user associated with that endpoint is needed on the main screen.

In various implementations, system 102 applies delay bias on each endpoint based on the ranking. For example, in some implementations, if a given endpoint has a lower ranking view rank value, system 102 applies a delay bias to that endpoint in order to delay the display the user associated with that endpoint on the main screen. Such a delay bias will be higher than that applied to other endpoints having higher ranking view rank values. This is because the lower the ranking view rank value of an endpoint, the less likely that the user associated with that endpoint is needed on the main screen.

Although the steps, operations, or computations may be presented in a specific order, the order may be changed in particular implementations. Other orderings of the steps are possible, depending on the particular implementation. In some implementations, multiple steps shown as sequential in this specification may be performed at the same time.

Implementations described herein provide various benefits. For example, implementations described herein also increase overall engagement among users in a social networking environment by enabling a broader range of users to participate in multi-user video conferences.

Figure 6:
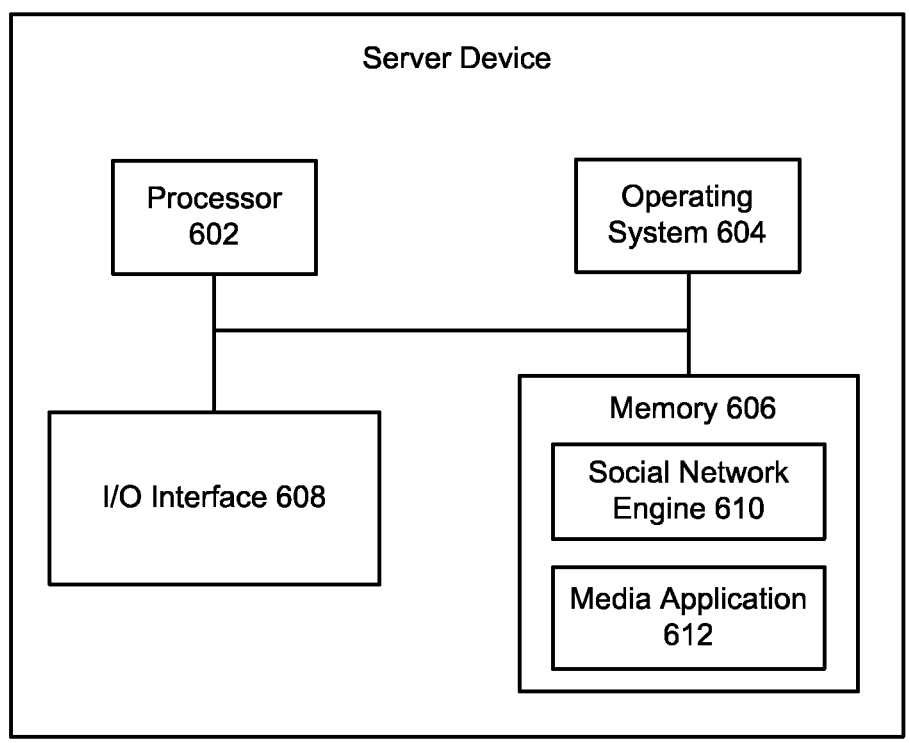
FIG. 6 illustrates a block diagram of an example server device, which may be used to implement the implementations described herein.

FIG. 6 illustrates a block diagram of an example server device 500, which may be used to implement the implementations described herein. For example, server device 600 may be used to implement server device 104 of FIG. 1, as well as to perform the method implementations described herein. In some implementations, server device 600 includes a processor 602, an operating system 604, a memory 606, and an input/output (I/O) interface 608. Server device 600 also includes a social network engine 610 and a media application 612, which may be stored in memory 606 or on any other suitable storage location or computer-readable medium. Media application 612 provides instructions that enable processor 602 to perform the functions described herein and other functions.

For ease of illustration, FIG. 6 shows one block for each of processor 602, operating system 604, memory 606, I/O interface 608, social network engine 610, and media application 612. These blocks 602, 604, 606, 608, 610, and 612 may represent multiple processors, operating systems, memories, I/O interfaces, social network engines, and media applications. In other implementations, server device 600 may not have all of the components shown and/or may have other elements including other types of elements instead of, or in addition to, those shown herein.

Although the description has been described with respect to particular implementations thereof, these particular implementations are merely illustrative, and not restrictive. Concepts illustrated in the examples may be applied to other examples and implementations.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some particular implementations, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A method comprising:
providing a user interface of a video conference between at least a first user and a second user, wherein the first user is associated with a first endpoint and the second user is associated with a second endpoint;
determining a respective view rank value for each of the first endpoint and the second endpoint, wherein the respective view rank value is based at least in part on an endpoint type, and wherein the endpoint type comprises a conference room endpoint type and a single user endpoint type; and
causing the user interface to display a first user video stream in a current presenter position and to display a second user video stream in a secondary presenter position based on the respective view rank values.

2. The method of claim 1, wherein determining the respective view rank value includes increasing the respective view rank value based on the endpoint being a single user endpoint type.

3. The method of claim 1, wherein determining the respective view rank value includes decreasing the respective view rank value based on the endpoint being a conference room endpoint type.

4. The method of claim 1, wherein the conference room endpoint type is used to represent a multiuser endpoint.

5. The method of claim 1, further comprising ranking the endpoints in the video conference based on their respective view rank values.

6. The method of claim 1, wherein each respective view rank value indicates a likelihood that a user associated with the respective endpoint is speaking.

7. The method of claim 1, wherein each respective view rank value is further based at least in part on a duration of speaking.

8. The method of claim 1, wherein each respective view rank value is further based at least in part on a type of audio detected.

9. A method comprising:
providing a user interface of a video conference between at least a first user and a second user, wherein the first user is associated with a first endpoint and the second user is associated with a second endpoint;
determining a respective view rank value for each of the first endpoint and the second endpoint, wherein the respective view rank value is based at least in part on a number of people who are associated with the respective endpoint; and causing the user interface to display a first user video stream in a current presenter position and to display a second user video stream in a secondary presenter position based on the respective view rank values.

10. The method of claim 9, further comprising determining the number of people who are in the room associated with the respective endpoint.

11. The method of claim 10, wherein determining the number of people who are in the room associated with the respective endpoint includes:
    applying a face detection algorithm to detect faces in a video stream associated with the respective endpoint; and
    determining the number of people who are in the room associated with the respective endpoint based on the detected faces.

12. The method of claim 9, further comprising updating the respective view rank value based on a predetermined number threshold of people in a room associated with a given endpoint.

13. The method of claim 9, further comprising decreasing the respective view rank value based on a room associated with the endpoint having at least a given number of people being detected as present in a room associated with the endpoint.

14. The method of claim 9, further comprising ranking the endpoints in the video conference based on their respective view rank values.

15. The method of claim 9, wherein each respective view rank value indicates a likelihood that the user associated with the respective endpoint is speaking.

16. The method of claim 9, wherein each respective view rank value is further based at least in part on a duration of speaking.

17. The method of claim 9, wherein each respective view rank value is further based at least in part on a type of audio detected.

18. A system comprising:
    one or more processors; and
    software instructions stored on a tangible computer readable medium that, when executed by the one or more processors, cause the one or more processors to perform operations comprising:
        providing a user interface of a video conference between at least a first user and a second user, wherein the first user is associated with a first endpoint and the second user is associated with a second endpoint;
        determining a respective view rank value for each of the first endpoint and the second endpoint, wherein the respective view rank value is based at least in part on one or more of an endpoint type and a number of people who are associated with the respective endpoint; and
        causing the user interface to display a first user video stream in a current presenter position and to display a second user video stream in a secondary presenter position based on the respective view rank values.

19. The system of claim 18, wherein the endpoint type comprises a conference room endpoint type and a single user endpoint type.

20. The system of claim 18, wherein the operations further comprise:
    determining the number of people who are in the room associated with the respective endpoint, wherein determining the number of people who are in the room associated with the respective endpoint includes:
    applying a face detection algorithm to detect faces in a video stream associated with the respective endpoint; and
    determining the number of people who are in the room associated with the respective endpoint based on the detected faces.

* * * * *